Patented Oct. 11, 1932

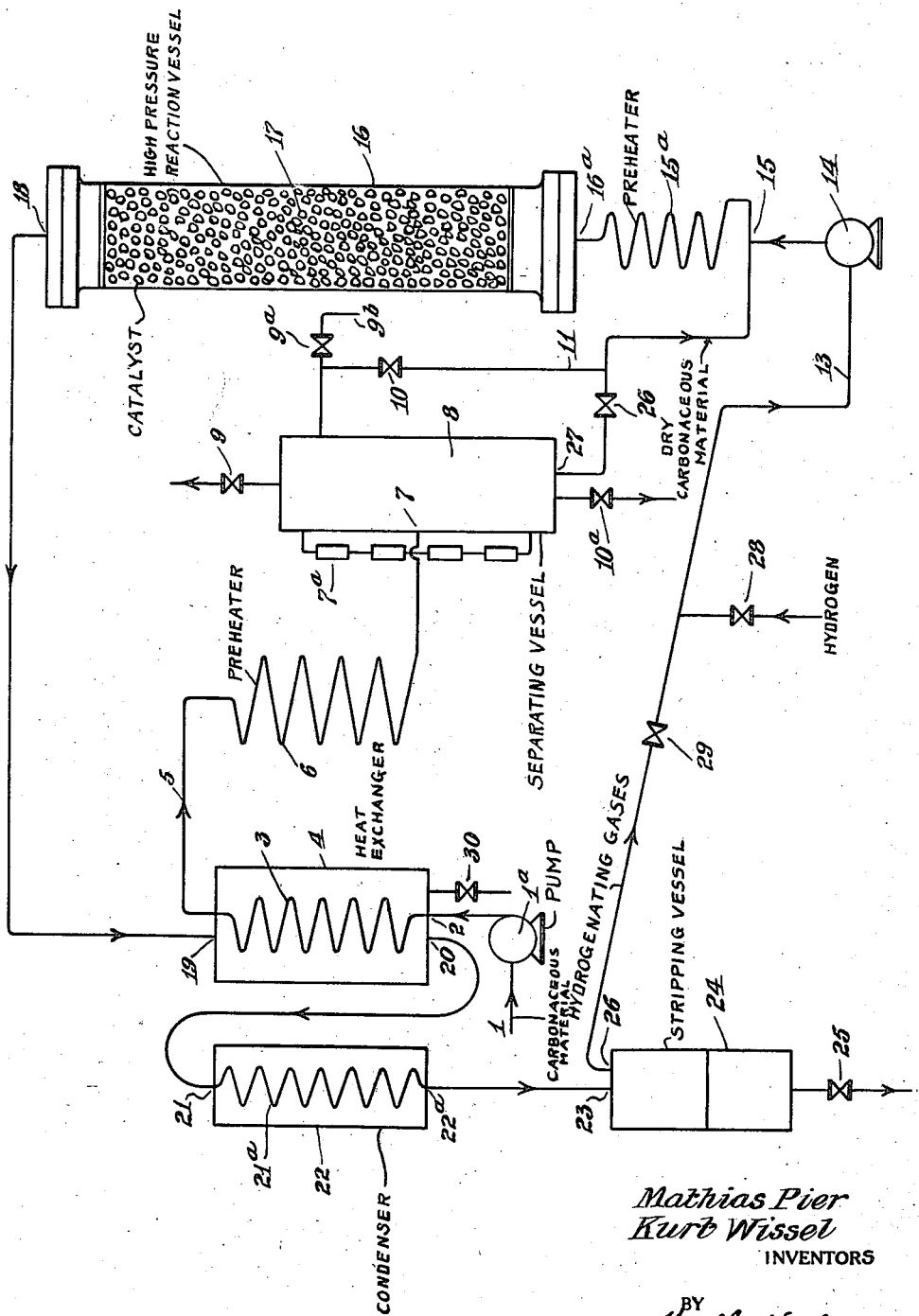

1,881,968

UNITED STATES PATENT OFFICE

MATHIAS PIER, OF HEIDELBERG, AND KURT WISSEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF DEHYDRATING MOIST FUEL

Application filed July 21, 1927, Serial No. 207,561, and in Germany July 21, 1926.

It is of great industrial importance to remove water from non-gaseous moist fuels, such as various kinds of coal, especially brown coal, tars, mineral oils, peat, wood and the like, particularly when the said materials are to be subjected to destructive hydrogenation, i. e. to a treatment with hydrogen or gases giving rise to hydrogen under elevated pressure and at high temperatures in order to produce valuable liquid products chiefly of low boiling points because in this reaction often no large amount of water should be present during the said reaction. It has been attempted to perform the dehydration by various processes, for example by centrifuging, pressing and the like, but in most cases the result aimed at has been obtained only incompletely or inconveniently.

We have now found that the water can be removed in a very simple manner from such non-gaseous fuels, which are insoluble in water by heating them as a fluid mass, that is when they are solid fuels together with fuels liquid under the conditions of working, or when they are liquid fuels these alone, to temperatures above 200° C. and under pressure, which should preferably be equal to or exceed the vapor tension of water at the temperature of the treatment, so that the water is separated practically completely in the liquid form. At a temperature of 200° C. a pressure of at least 16 atmospheres should be employed. The greater part of the water separates quickly and can be drawn off. By a single treatment in the said manner the fuel is dehydrated sufficiently for most purposes. In case a complete dehydration is desired, this is preferably effected by repeating the said treatment under the same or other conditions of working as employed in the first treatment, rather than by a prolonged one-stage treatment. Part of the heat supplied to the fuel may be recovered and utilized for example for preheating fresh material.

The present process is of special importance in the processes for converting coals, tars, mineral oils and the like into more valuable products by destructive hydrogenation i. e. treating the said materials with hydrogen or gases giving rise to hydrogen under pressure and at high temperatures, as the said materials can be preheated in a dry condition or with a predeterminable content of water to about the temperature required for the said conversion process. The heat contained in the separated water can also be used in the present process, for example, for preheating fresh initial material.

The drying operation and the separation of water may be furthered by the employment of other expedients, for example by stirring, centrifuging, alternate motion and rest, by the action of an electric field, and the like. Agents accelerating the drying process may also be added to the moist fuel, for example, substances which influence the surface tension of water such as aniline or sulfonic acids of aromatic or hydroaromatic compounds containing alkyl groups or salts thereof.

The process according to the present invention may also be carried out continuously, for which purpose heating of the moist fuel is preferably carried out in a coil from which the material passes into a separator in which the water is separated.

The process may also advantageously be carried out if the water is formed only in the course of a reaction as is the case, for example, when an oxygen-containing coal is treated with hydrogen under pressure and at elevated temperature. In this case the desired reaction products are not decomposed or otherwise influenced by the removal of the water.

The invention will be further illustrated in a diagrammatical manner with reference to the accompanying drawing which shows a side elevation partly in section of one form of apparatus suitable for carrying out the process according to the present invention, though it should be understood that the invention is not limited to a process carried out in the specific apparatus illustrated. The apparatus in question is for a process of dehydrating moist fuel and subjecting said fuel to a destructive hydrogenation.

The moist, non-gaseous carbonaceous material to be treated, for example, tar, or a paste of brown coal in tar, or a mineral oil, is introduced by way of pipe 1 and pump 1a through the pipe 2 into a coil 3, situated in a heat exchanger 4. The material thus preheated is passed by way of pump 5 into a second preheater 6 and thence through the inlet 7 into a separating vessel 8, provided with show glasses 7a. The material under treatment now may stand under a pressure of about 200 atmospheres and may have a temperature for example of about 320° C. In the said separator the water contained in the carbonaceous material separates almost completely in the liquid form as an aqueous layer which, depending on the differences of specific gravity between the water under the working conditions and the carbonaceous material, separates as an upper or lower layer. If the water separates as an upper layer, it is drawn off through valve 9a at 9b, the valve 10 being closed. In this case the carbonaceous material is drawn off from the separating vessel 8 at 27 through valve 26 to be passed on to the hydrogenating vessel. If, however, the water separates as a lower layer, it is drawn off through the pipe 10a, the valves 9a and 26 being kept closed. The carbonaceous material is drawn off at 10 and passed on to the high pressure vessel 16 for destructive hydrogenation. Fresh hydrogen is introduced through valve 28 and pipe 13 and by means of the pump 14 into the system and intermixed at the branch point 15 with the dehydrated carbonaceous material to be treated. The mixture of hydrogen and carbonaceous material is preheated in the coil 15a and introduced into the high pressure reaction vessel 16 at 16a. The said vessel is filled with a catalyst 17. A temperature, for example, of about 420° C. is maintained in the said reaction vessel. The reaction products pass off from the said reaction vessel at 18 and are conducted to the heat exchanger 4 which they enter at 19 and leave at 20. Any products condensed in the said heat exchanger may be withdrawn by way of the valve 30. The reaction products from the heat exchanger are now passed on to the condenser 22 in which they are passed to the coil 21a. They enter said coil at 21 and leave it at 22a. The condensed products and gases are passed into the stripping vessel 24 at 23. The liquid reaction products are withdrawn through the valve 25 and the hydrogenating gases are passed off at 26 and are recycled to the process through valve 29.

The following example will further illustrate how our invention may be carried out in practice, but the invention is not limited to this example.

*Example*

Crude brown coal containing 50 per cent of water is mixed with an equal amount, by weight, of tar and heated to 320° C. under a pressure of 200 atmospheres. The bulk of the water separates out quickly as an aqueous layer and after it has been drawn off, the hot material is immediately subjected to destructive hydrogenation by treatment with hydrogen under pressure in order to produce valuable hydrocarbons.

It is very suitable and economical to utilize the heat regenerated in the condensation of the products obtained by the destructive hydrogenation as a supply of the heat needed for the dehydration process.

In a similar way crude brown coal tar containing 50 per cent of water can be dried, for example it may be dried in a first run to a water content of 10 to 15 per cent and completely dried in a second run.

What we claim is:

1. The process of dehydrating non-gaseous moist fuels insoluble in water which comprises heating brown coal together with a liquid fuel to temperatures above 200° C. and under such a high water vapor pressure that the water separates from the fuel practically completely in the liquid form, allowing the water to form an aqueous layer and removing the water thus separated.

2. A process for the destructive hydrogenation of moist solid fuels insoluble in water which consists in adding liquid fuel to the said solid fuel, heating the said fuel, in conjunction, with the added liquid fuel, to temperatures above 200° C. and under such a high water vapor pressure that the water separates from the fuel practically completely in the liquid form, allowing the water to form an aqueous layer, removing the water thus separated and treating the hot fuel immediately after the dehydration with hydrogen or gases giving rise to hydrogen under pressure and at elevated temperatures in order to produce valuable hydrocarbons.

3. A process for the destructive hydrogenation of moist non-gaseous fuels, which comprises heating the same as a fluid mass to a temperature above 200° C. and under such a high water vapor pressure that the water separates practically completely in the liquid form, allowing the water to form an aqueous layer, removing the water thus separated and treating the hot fuel immediately after the dehydration with hydrogen or gases giving rise to hydrogen under pressure and at elevated temperatures in order to produce valuable hydrocarbons.

4. The process of dehydrating solid and semi-solid moist fuels, insoluble in water, which comprises heating a fuel of said nature as a fluid mass to a temperature above 200° C. and under such a high water vapor pressure that the water separates from the fuel practically completely in the liquid form, allowing the water to form an aqueous layer and removing the water thus separated.

5. The process of dehydrating solid and semi-solid moist fuels, insoluble in water, which comprises heating a fuel of said nature as a fluid mass to a temperature above 200° C. and under water vapor pressures higher than the vapor tension of water at the temperature of working, so that the water separates from the fuel practically completely in the liquid form, allowing the water to form an aqueous layer and removing the water thus separated.

6. In the process of dehydrating moist brown coal, the steps which comprises mixing said coal with about an equal amount by weight of tar, and heating the mixture in a closed vessel to about 320° C. under a pressure of about 200 atmospheres.

7. A process for the destructive hydrogenation of crude moist brown coal, which comprises mixing said brown coal with about an equal amount by weight of tar, heating the mixture to about 320° C. and under a pressure of about 200 atmospheres in a closed vessel, allowing the water to separate out as an aqueous layer, drawing off the water and subjecting the dehydrated material to a destructive hydrogenation with hydrogen under pressure.

In testimony whereof we have hereunto set our hands.

MATHIAS PIER.
KURT WISSEL.